US012455609B2

(12) United States Patent
Kuo et al.

(10) Patent No.: US 12,455,609 B2
(45) Date of Patent: Oct. 28, 2025

(54) HEAT DISSIPATION CONTROL METHOD, AND ELECTRONIC APPARATUS AND PORTABLE ELECTRONIC DEVICE TO WHICH HEAT DISSIPATION CONTROL METHOD IS APPLICABLE

(71) Applicant: ASUSTEK COMPUTER INC., Taipei (TW)

(72) Inventors: Chih-Yao Kuo, Taipei (TW); Ya-Han Chang, Taipei (TW); Huang-Chieh Huang, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 194 days.

(21) Appl. No.: 18/226,437

(22) Filed: Jul. 26, 2023

(65) Prior Publication Data

US 2024/0319777 A1 Sep. 26, 2024

(30) Foreign Application Priority Data

Mar. 24, 2023 (TW) .................................. 112111249

(51) Int. Cl.
*G06F 1/20* (2006.01)
*G06F 1/3206* (2019.01)
(Continued)

(52) U.S. Cl.
CPC ............ *G06F 1/3234* (2013.01); *G06F 1/203* (2013.01); *G06F 1/206* (2013.01); *G06F 1/3206* (2013.01);
(Continued)

(58) Field of Classification Search
CPC ................................. G06F 1/203; G06F 1/206
See application file for complete search history.

(56) References Cited

U.S. PATENT DOCUMENTS

| 9,907,204 B2* | 2/2018 | Guo .................. H05K 7/20209 |
| 2013/0033819 A1* | 2/2013 | Chiu ......................... G06F 1/20 361/695 |

(Continued)

FOREIGN PATENT DOCUMENTS

| CN | 104750213 A | 7/2015 |
| CN | 210129217 U | 3/2020 |
| CN | 112825401 A | 5/2021 |

*Primary Examiner* — Jaweed A Abbaszadeh
*Assistant Examiner* — Ayman Fatima
(74) *Attorney, Agent, or Firm* — Muncy, Geissler, Olds & Lowe, P.C.

(57) ABSTRACT

A heat dissipation control method applicable to a portable electronic device is provided. The portable electronic device is adapted to mount a heat dissipation back clip, and the heat dissipation back clip includes a cooling chip and a heat dissipation fan. The cooling chip has an adjustable cooling power consumption, and the heat dissipation fan has a heat removal wattage. The heat dissipation control method includes: detecting a real-time system power consumption of the portable electronic device; obtaining the cooling power consumption and the heat removal wattage; determining whether a sum of the real-time system power consumption and the cooling power consumption is greater than the heat removal wattage; and lowering the cooling power consumption if the sum is greater than the heat removal wattage. An electronic device and a portable electronic device to which the heat dissipation control method is applicable are further provided.

10 Claims, 7 Drawing Sheets

(51) Int. Cl.
*G06F 1/3234* (2019.01)
*H05K 7/20* (2006.01)
(52) U.S. Cl.
CPC ..... *H05K 7/20136* (2013.01); *H05K 7/20209* (2013.01)

(56) References Cited

U.S. PATENT DOCUMENTS

| | | | |
|---|---|---|---|
| 2016/0033974 A1* | 2/2016 | North | H05K 7/2079 700/300 |
| 2017/0112015 A1* | 4/2017 | Kang | G06F 1/266 |
| 2021/0181823 A1* | 6/2021 | Young | G06F 1/206 |

* cited by examiner

HEAT DISSIPATION CONTROL METHOD, AND ELECTRONIC APPARATUS AND PORTABLE ELECTRONIC DEVICE TO WHICH HEAT DISSIPATION CONTROL METHOD IS APPLICABLE

CROSS-REFERENCE TO RELATED APPLICATION

The disclosure claims the priority benefit of Taiwan application serial No. 112111249, filed on Mar. 24, 2023. The entirety of the above-mentioned patent application is hereby incorporated by reference herein and made a part of the specification.

BACKGROUND OF THE INVENTION

Field of the Invention

The disclosure relates to a control method of an electronic device, and in particular, to a heat dissipation control method and a portable electronic device to which the heat dissipation control method is applicable.

Description of the Related Art

At present, when an electronic device on the market uses a cooling chip for heat dissipation, the electronic device usually operates at a maximum power of the cooling chip without taking a heat dissipation capability of a heat dissipation fan into account. As a result, the power consumption usually increases but no significant heat dissipation effect is generated.

BRIEF SUMMARY OF THE INVENTION

The disclosure provides a heat dissipation control method, applicable to a portable electronic device. The portable electronic device is adapted to mount a heat dissipation back clip, and the heat dissipation back clip includes a cooling chip and a heat dissipation fan. The cooling chip has an adjustable cooling power consumption, and the heat dissipation fan has a heat removal wattage. The heat dissipation control method includes: detecting a real-time system power consumption of the portable electronic device; obtaining the cooling power consumption and the heat removal wattage; determining whether a sum of the real-time system power consumption and the cooling power consumption is greater than the heat removal wattage; and lowering the cooling power consumption if the sum is greater than the heat removal wattage.

The disclosure further provides a portable electronic device, adapted to mount a heat dissipation back clip. The heat dissipation back clip includes a cooling chip and a heat dissipation fan. The cooling chip has an adjustable cooling power consumption, and the heat dissipation fan has a heat removal wattage. The portable electronic device includes a connector and a control unit. The connector is configured to be electrically connected to the heat dissipation back clip. The control unit is electrically coupled to the connector, and configured to: detect a real-time system power consumption of the portable electronic device; obtain the cooling power consumption and the heat removal wattage through the connector; determine whether a sum of real-time system power consumption and the cooling power consumption is greater than the heat removal wattage; and output an instruction to the heat dissipation back clip through the connector to lower the cooling power consumption if the sum is greater than the heat removal wattage.

The disclosure further provides an electronic apparatus. The electronic apparatus includes a heat dissipation back clip and a portable electronic device. The heat dissipation back clip includes a cooling chip, a heat dissipation fan, and a controller. The cooling chip has a cooling power consumption. The heat dissipation fan has a heat removal wattage. The controller is electrically coupled to the cooling chip and the heat dissipation fan, and configured to adjust the cooling power consumption and control operation of the heat dissipation fan. The heat dissipation back clip is mounted on the portable electronic device. The portable electronic device includes a connector and a control unit. The connector is configured to be electrically connected to the heat dissipation back clip. The control unit is electrically coupled to the connector, and configured to: detect a real-time system power consumption of the portable electronic device; obtain the cooling power consumption and the heat removal wattage through the connector; determine whether a sum of the real-time system power consumption and the cooling power consumption is greater than the heat removal wattage; and output an instruction to the controller through the connector to lower the cooling power consumption if the sum is greater than the heat removal wattage.

The heat dissipation control method provided in the disclosure takes the real-time system power consumption of the portable electronic device, the cooling power consumption produced by the cooling chip and the heat removal wattage of the heat dissipation fan into account, and then the portable electronic device is controlled, thereby avoiding the problem that the overall power consumption increases but no significant heat dissipation effect is generated.

DETAILED DESCRIPTION OF THE EMBODIMENTS

Specific implementations of the disclosure are described in more detail with reference to the drawings. Advantages and features of the disclosure are clearer according to the following descriptions and claims. It is to be noted that, the drawings adopt a very simplified form and use a non-precise proportion, and are merely used for conveniently and clearly assisting in describing the objective of the embodiments of the disclosure.

Figure 1:
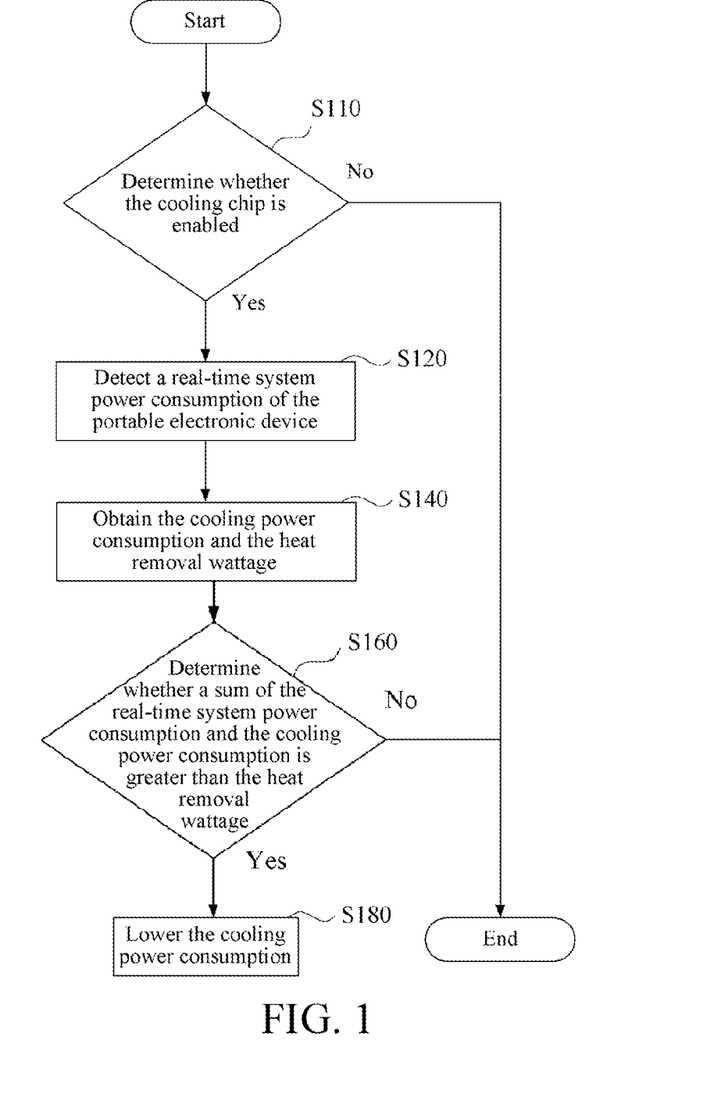
FIG. 1 is a flowchart of a heat dissipation control method according to an embodiment of the disclosure.
Figure 2:
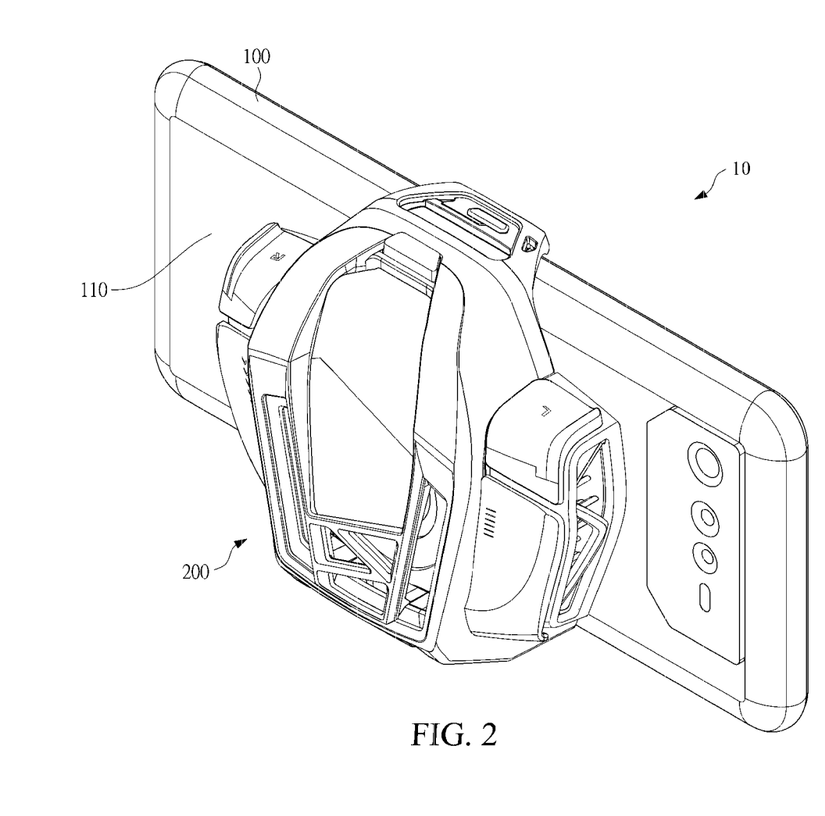
FIG. 2 is a three-dimensional schematic diagram of an electronic apparatus to which the heat dissipation control method in FIG. 1 is applicable.

FIG. 1 is a flowchart of a heat dissipation control method according to an embodiment of the disclosure. FIG. 2 is a three-dimensional schematic diagram of an electronic apparatus 10 to which the heat dissipation control method in FIG.

Figure 3:
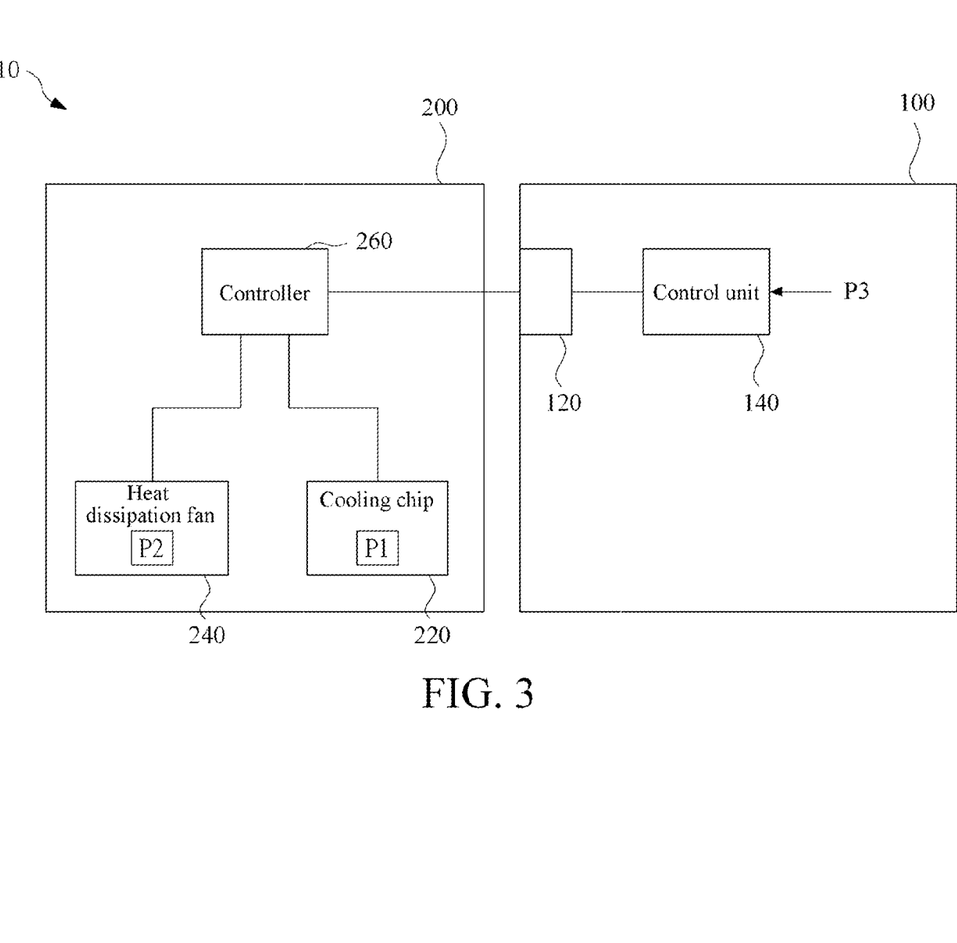
FIG. 3 is a block diagram of an electronic apparatus to which the heat dissipation control method in FIG. 1 is applicable.

1 is applicable. FIG. 3 is a block diagram of an electronic apparatus 10 to which the heat dissipation control method in FIG. 1 is applicable:

As shown in the figures, the heat dissipation control method provided in the disclosure is applicable to a portable electronic device 100. The portable electronic device 100 is adapted to mount a heat dissipation back clip 200. When the heat dissipation back clip 200 is mounted on the portable electronic device 100, the portable electronic device 100 and the heat dissipation back clip 200 form an electronic apparatus 10. The heat dissipation back clip 200 is mounted on a back cover 110 of the portable electronic device 100. The portable electronic device 100 is a smartphone or a tablet computer.

The heat dissipation back clip 200 includes a cooling chip 220, a heat dissipation fan 240, and a controller 260. The cooling chip 220 has a cooling power consumption P1. The heat dissipation fan 240 has a heat removal wattage P2. The cooling power consumption P1 refers to a power consumption produced during operation of the cooling chip 220, and is in the unit of Watt. The heat removal wattage P2 refers to heat carried away by the heat dissipation fan 240 during operation, and is in the unit of Watt.

The controller 260 is electrically coupled to the cooling chip 220 and the heat dissipation fan 240, and configured to adjust the cooling power consumption P1 of the cooling chip 220 and control operation of the heat dissipation fan 240. For adjusting the cooling power consumption P1 of the cooling chip 220, in an embodiment, the cooling power consumption P1 is adjusted by controlling a temperature difference between a cold surface and a hot surface of the cooling chip 220. A smaller temperature difference indicates that less cooling power consumption P1 is produced. In an embodiment, the controller 260 is a micro controller unit (MCU).

The portable electronic device 100 includes a connector 120 and a control unit 140. The connector 120 is configured to be electrically connected to the heat dissipation back clip 200. The control unit 140 is electrically coupled to the connector 120 and controls operation of the heat dissipation back clip 200 through the connector 120. The control unit 140 also detects a real-time system power consumption P3 of the portable electronic device 100. In an embodiment, the real-time system power consumption P3 is a sum of power consumptions of main hardware components of the portable electronic device 100. In an embodiment, the real-time system power consumption P3 includes a sum of real-time power consumptions of a central processing unit (CPU), a graphics processing unit (GPU), and a memory.

In an embodiment, the connector 120 is a universal serial bus connector 120. The connector 120 is configured to transmit both data and power. That is, when it is necessary, the portable electronic device 100 may supply power to the cooling holder 200 through the connector 120. In an embodiment, the control unit 140 is an embedded controller (EC).

Referring to FIG. 1 again, the heat dissipation control method in the disclosure includes the following steps.

First, as described in a determination step S110, whether the cooling chip 220 is enabled is determined. If the cooling chip 220 has not been enabled, the process ends. If the cooling chip 220 has been enabled, the process proceeds to step S120.

Then, as described in step S120, a real-time system power consumption P3 of the portable electronic device 100 is detected. This step is performed by the control unit 140 of the portable electronic device 100.

Then, as described in step S140, the cooling power consumption P1 and the heat removal wattage are obtained. This step is performed by the control unit 140 of the portable electronic device 100. The control unit 140 communicates with the heat dissipation back clip 200 through the connector 120 to obtain the current cooling power consumption P1 of the cooling chip 220, and determine a specification of the heat dissipation fan 240 to obtain the heat removal wattage P2.

Next, as described in a determination step S160, whether a sum of the real-time system power consumption P3 and the cooling power consumption P1 is greater than the heat removal wattage P2 is determined. This step is performed by the control unit 140 of the portable electronic device 100.

If the sum of the real-time system power consumption P3 and the cooling power consumption P1 is greater than the heat removal wattage P2, the process proceeds to step S180 to lower the cooling power consumption P1. If the sum of the real-time system power consumption P3 and the cooling power consumption P1 is less than the heat removal wattage P2, the process ends and the cooling chip 220 operates according to the original cooling power consumption P1. This step is performed by the control unit 140 of the portable electronic device 100 together with the controller 260 of the heat dissipation back clip 200.

The heat dissipation control method provided in this embodiment is to detect the real-time system power consumption P3 first, and then obtain the cooling power consumption P1 and the heat removal wattage P2. In other embodiments, the foregoing steps S120 and S140 are interchangeable. In other embodiments, the specification of the heat dissipation fan 240 is detected to obtain the heat removal wattage P2 first, and then the real-time system power consumption P3 and the cooling power consumption P1 are detected.

Figure 4:
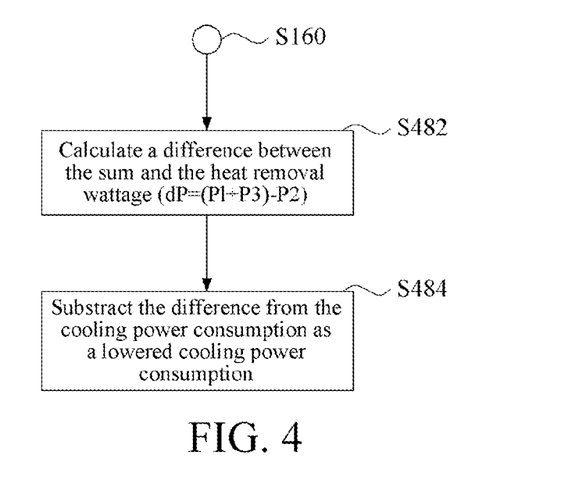
FIG. 4 shows another embodiment of step S180 in FIG. 1.

FIG. 4 shows another embodiment of step S180 in FIG. 1. As shown in the figure, following step S160, if the sum of the real-time system power consumption P3 and the cooling power consumption P1 is greater than the heat removal wattage P2, the process proceeds to step S482 to calculate a difference dP between the heat removal wattage P2 and the sum of the real-time system power consumption P3 and the cooling power consumption P1. Then, as described in step S484, the difference dP is subtracted from the cooling power consumption P1 as a lowered cooling power consumption P1.

In an example, it is assumed that the real-time system power consumption P3 is 60 watts, the cooling power consumption P1 is 20 watts, and the heat removal wattage P2 is 75 watts. The sum of the real-time system power consumption P3 and the cooling power consumption P1 is 80 watts, which is greater than the heat removal wattage P2. The difference dP between the heat removal wattage P2 and the sum of the real-time system power consumption P3 and the cooling power consumption P1 is 5 watts (80 watts minus 75 watts). In this case, the original cooling power consumption P1 of 20 watts is lowered to 15 watts (20 watts minus 5 watts).

Figure 5:
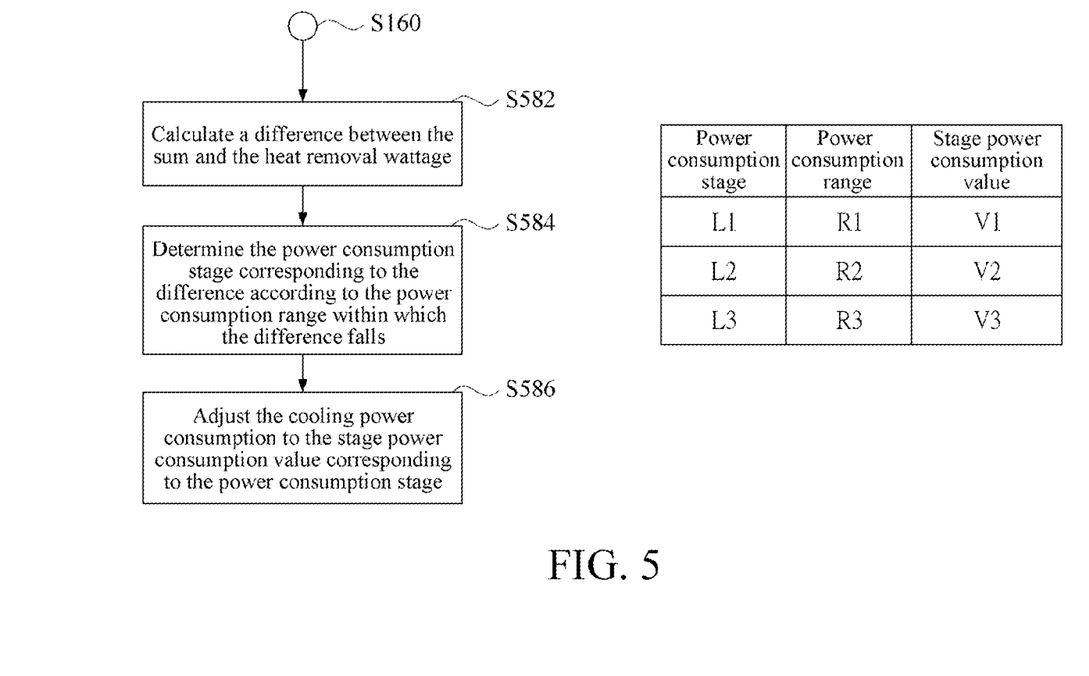
FIG. 5 shows yet another embodiment of step S180 in FIG. 1.

FIG. 5 shows yet another embodiment of step S180 in FIG. 1. This embodiment is applicable to cases in which the cooling chip 220 is provided with a plurality of power consumption stages L1, L2, and L3 for adjustment. The power consumption stages L1, L2, and L3 correspond to power consumption ranges R1, R2, and R3 and stage power consumption values V1, V2, and V3, respectively. In this embodiment, the three power consumption stages L1, L2, and L3 are used as examples. The power consumption ranges R1, R2, and R3 corresponding to the three power consumption stages L1, L2, and L3 do not overlap each other.

As shown in the figure, following step S160, if the sum of the real-time system power consumption P3 and the cooling power consumption P1 is greater than the heat removal wattage P2, the process proceeds to step S582 to calculate a difference dP between the sum and the heat removal wattage P2. Then, as described in step S584, the power consumption stages L1, L2, and L3 corresponding to the difference dP are determined according to the power consumption ranges R1, R2, and R3 within which the difference dP falls. Next, as described in step S586, the cooling power consumption P1 is adjusted to the stage power consumption values V1, V2, and V3 corresponding to the power consumption stages L1, L2, L3.

In an example, it is assumed that the real-time system power consumption P3 is 70 watts, the cooling power consumption P1 is 20 watts, and the heat removal wattage P2 is 75 watts. The sum of the real-time system power consumption P3 and the cooling power consumption P1 is 90 watts, which is greater than the heat removal wattage P2. The difference dP between the heat removal wattage P2 and the sum of the real-time system power consumption P3 and the cooling power consumption P1 is 15 watts (90 watts minus 75 watts).

It is assumed that the cooling chip 220 has three power consumption stages L1, L2, and L3, and the corresponding stage power consumption values V1, V2, and V3 are 0-watt power consumption (i.e. no power consumption), 10-watt power consumption, and 20-watt power consumption, respectively. The 0-watt power consumption corresponds to the power consumption range R1 of 0 to 10 watts (but excluding 10 watts), the 10-watt power consumption corresponds to the power consumption range R2 of 10 to 20 watts (but excluding 20 watts), and the 20-watt power consumption corresponds to the power consumption range R3 of more than 20 watts (but excluding 20 watts).

The difference dP between the heat removal wattage P2 and the sum of the real-time system power consumption P3 and the cooling power consumption P1 is 15 watts, falling within the power consumption range R2 corresponding to the 10-watt power consumption. In this way, the original cooling power consumption P1 of 20 watts is lowered to the stage power consumption value V1 corresponding to the power consumption range R2, that is, 10 watts.

In the embodiments of FIG. 4 and FIG. 5, the cooling power consumption P1 is lowered according to the difference dP between the heat removal wattage P2 and the sum of the real-time system power consumption P3 and the cooling power consumption P1. In other embodiments, if the sum of the real-time system power consumption P3 and the cooling power consumption P1 is greater than the heat removal wattage P2, the cooling power consumption P1 is directly lowered according to a preset value to simplify the control process.

Figure 6:
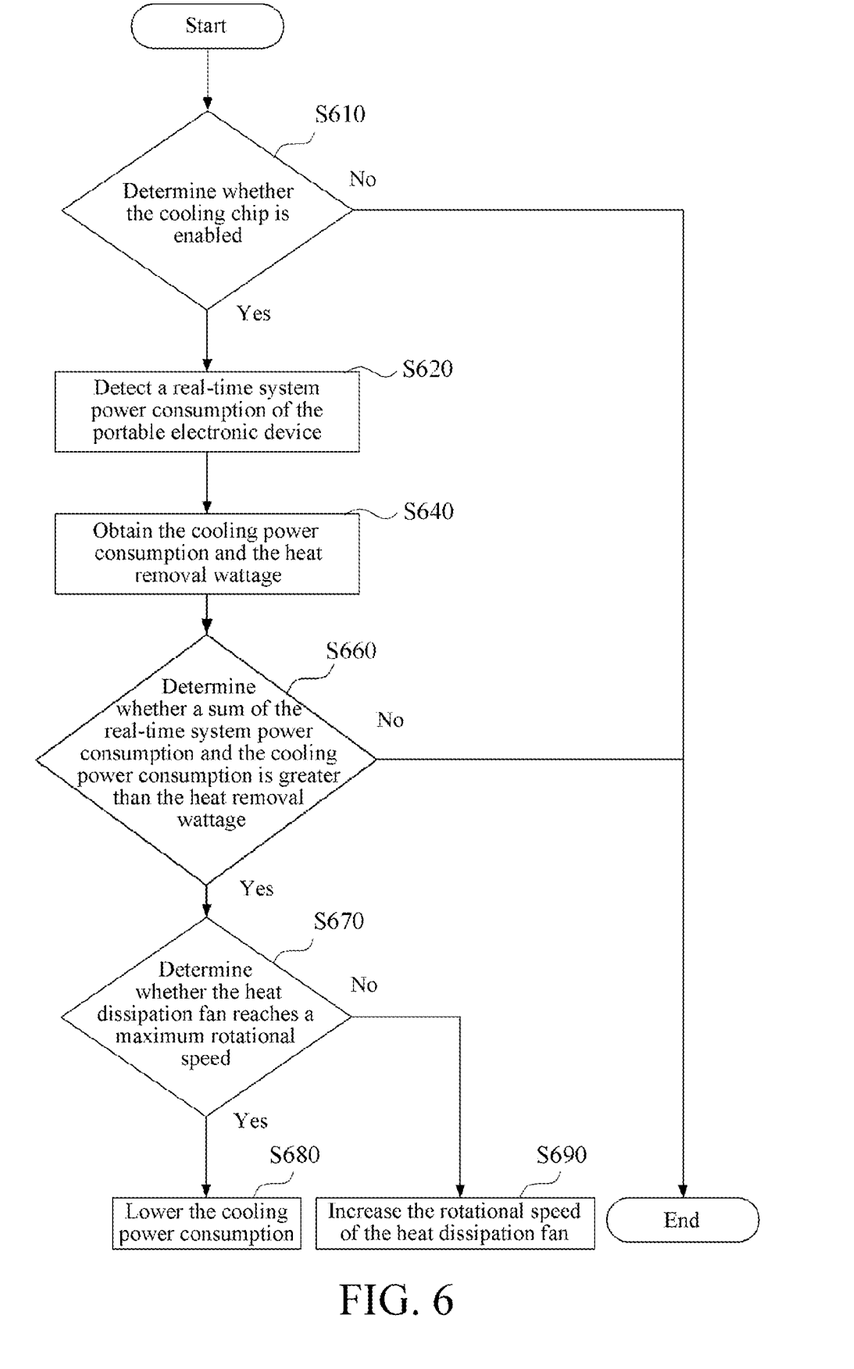
FIG. 6 is a flowchart of a heat dissipation control method according to another embodiment of the disclosure.

FIG. 6 is a flowchart of a heat dissipation control method according to another embodiment of the disclosure. A main difference between this embodiment and the first embodiment is that a determination step is added in this embodiment to determine whether the heat dissipation fan 240 has reached a maximum rotational speed. The heat dissipation control method is also applicable to the electronic apparatus 10 shown in FIG. 3 and FIG. 4.

First, as described in a determination step S610, whether the cooling chip 220 is enabled is determined. If the cooling chip 220 has not been enabled, the process ends. If the cooling chip 220 has been enabled, the process proceeds to step S620.

Then, as described in step S620, a real-time system power consumption P3 of the portable electronic device 100 is detected. Then, as described in step S640, the cooling power consumption P1 and the heat removal wattage are obtained. Steps S610, S620, and S640 are similar to steps S110, S120, and S140 in FIG. 1.

Next, as described in a determination step S660, whether a sum of the real-time system power consumption P3 and the cooling power consumption P1 is greater than the heat removal wattage P2 is determined. If the sum of the real-time system power consumption P3 and the cooling power consumption P1 is greater than the heat removal wattage P2, the process proceeds to a determination step S670. If the sum of the real-time system power consumption P3 and the cooling power consumption P1 is less than the heat removal wattage P2, the process ends.

As described in the determination step S670, whether the heat dissipation fan 240 reaches a maximum rotational speed is determined. If the heat dissipation fan 240 has reached the maximum speed, the process proceeds to step S680 to lower the cooling power consumption P1. If the heat dissipation fan 240 has not reached the maximum rotational speed, the process proceeds to step S690 to increase the rotational speed of the heat dissipation fan 240.

As shown in FIG. 6, even if the sum of the real-time system power consumption P3 and the cooling power consumption P1 is greater than the current heat removal wattage P2 provided by the heat dissipation fan 240, the heat dissipation control method re-determines whether the heat dissipation fan 240 reaches the maximum rotational speed, that is, whether the heat dissipation fan 240 provides a higher heat removal wattage P2, and lowers the cooling power consumption P1 only in a case that the heat dissipation fan 240 does not provide a higher heat removal wattage P2. In this way, it is ensured that the cooling chip 220 fully exerts the efficiency.

Figure 7:
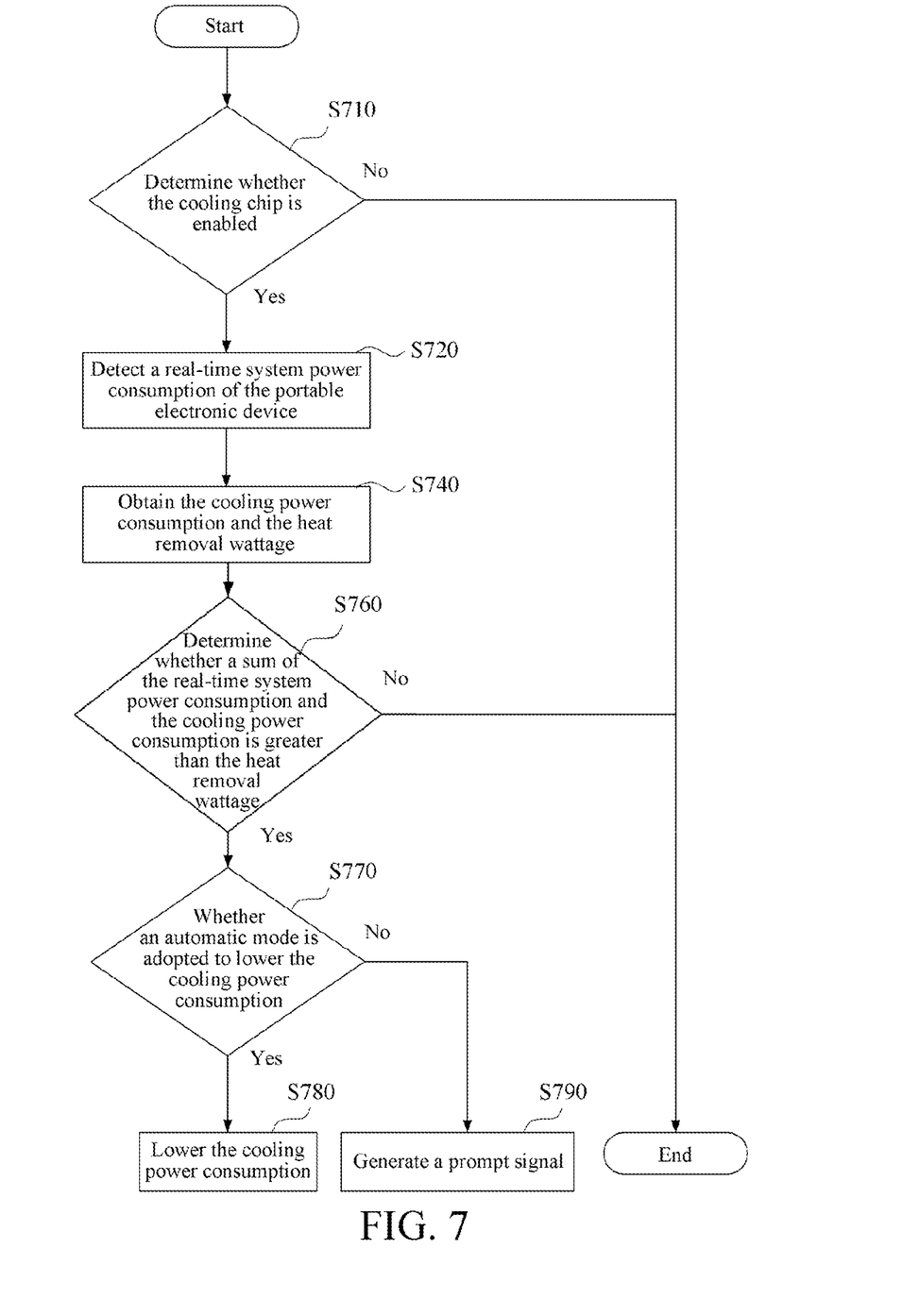
FIG. 7 is a flowchart of a heat dissipation control method according to yet another embodiment of the application.

FIG. 7 is a flowchart of a heat dissipation control method according to yet another embodiment of the disclosure. A main difference between this embodiment and the first embodiment is that a determination step is added before the step of lowering the cooling power consumption P1 in this embodiment to determine whether to adopt an automatic mode to lower the cooling power consumption P1. The heat dissipation control method is also applicable to the electronic apparatus 10 shown in FIG. 3 and FIG. 4.

First, as described in a determination step S710, whether the cooling chip 220 is enabled is determined. If the cooling chip 220 has not been enabled, the process ends. If the cooling chip 220 has been enabled, the process proceeds to step S720.

Then, as described in step S720, a real-time system power consumption P3 of the portable electronic device 100 is detected. Then, as described in step S740, the cooling power consumption P1 and the heat removal wattage are obtained. Steps S710, S720, and S740 are similar to steps S110, S120, and S140 in FIG. 1.

Next, as described in a determination step S760, whether a sum of the real-time system power consumption P3 and the cooling power consumption P1 is greater than the heat removal wattage P2 is determined. If the sum of the real-time system power consumption P3 and the cooling power consumption P1 is greater than the heat removal wattage P2, the process proceeds to a determination step S770 to determine whether to adopt an automatic mode to lower the cooling power consumption P1. If the sum of the real-time system power consumption P3 and the cooling power consumption P1 is less than the heat removal wattage P2, the process ends.

In the determination step S770, whether to adopt an automatic mode to lower the cooling power consumption P1 determined. If it is to adopt an automatic mode to lower the cooling power consumption P1, the process proceeds to step S780 to lower the cooling power consumption P1. If it is not to adopt an automatic mode to lower the cooling power consumption P1, the process proceeds to step S790 to generate a prompt signal to remind a user that the sum of the real-time system power consumption P3 and the cooling power consumption P1 is greater than the heat removal wattage P2 provided by the heat dissipation fan 240. The prompt signal is a reminder window, an audio signal, or an optical signal.

The heat dissipation control method provided in the disclosure takes the real-time system power consumption P3 of the portable electronic device 100, the cooling power consumption P1 produced by the cooling chip, and the heat removal wattage P2 of the heat dissipation fan 240 into account, thereby avoiding the problem that the overall power consumption of the portable electronic device 100 and the heat dissipation back clip 200 increases but no significant heat dissipation effect is generated.

The above descriptions are merely exemplary embodiments of the disclosure and do not limit the disclosure. Variations such as equivalent replacements or modifications in any form made by any person skilled in the art to the technical means and technical contents disclosed in the disclosure without departing from the technical means of the disclosure are contents not departing from the technical means of the disclosure and still fall within the protection scope of the disclosure.

What is claimed is:

1. A heat dissipation control method, applicable to a portable electronic device, wherein the portable electronic device is adapted to mount a heat dissipation back clip, and the heat dissipation back clip comprises a thermoelectric cooling chip and a heat dissipation fan, wherein the thermoelectric cooling chip has an adjustable cooling power consumption, the heat dissipation fan has a heat removal wattage, and the heat dissipation control method comprises:
   detecting a real-time system power consumption of the portable electronic device;
   obtaining the cooling power consumption and the heat removal wattage;
   determining whether a sum of the real-time system power consumption and the cooling power consumption is greater than the heat removal wattage; and
   lowering the cooling power consumption if the sum is greater than the heat removal wattage.

2. The heat dissipation control method according to claim 1, wherein, the step of lowering the cooling power consumption if the sum is greater than the heat removal wattage comprises:
   calculating a difference between the sum and the heat removal wattage; and
   lowering the cooling power consumption according to the difference.

3. The heat dissipation control method according to claim 2, wherein the step of lowering the cooling power consumption according to the difference comprises:
   subtracting the difference from the cooling power consumption as a lowered cooling power consumption.

4. The heat dissipation control method according to claim 2, wherein the thermoelectric cooling chip is provided with a plurality of power consumption stages, each of the power consumption stage corresponds to a power consumption range and a stage power consumption value, and the step of lowering the cooling power consumption according to the difference comprises:
   determining the power consumption stage corresponding to the difference according to the power consumption range within which the difference falls; and
   adjusting the cooling power consumption to the stage power consumption value corresponding to the power consumption stage.

5. The heat dissipation control method according to claim 1, wherein before the step of determining whether the sum of the real-time system power consumption and the cooling power consumption is greater than the heat removal wattage, the method further comprises:
   determining whether the heat dissipation fan reaches a maximum rotational speed.

6. A portable electronic device, adapted to mount a heat dissipation back clip, wherein the heat dissipation back clip comprises a thermoelectric cooling chip and a heat dissipation fan, wherein the thermoelectric cooling chip has an adjustable cooling power consumption, the heat dissipation fan has a heat removal wattage, and the portable electronic device comprises:
   a connector, configured to be electrically connected to the heat dissipation back clip; and
   a control unit, electrically coupled to the connector, and configured to:
     detect a real-time system power consumption of the portable electronic device;
     obtain the cooling power consumption and the heat removal wattage through the connector;
     determine whether a sum of the real-time system power consumption and the cooling power consumption is greater than the heat removal wattage; and
     output an instruction to the heat dissipation back clip through the connector to lower the cooling power consumption if the sum is greater than the heat removal wattage.

7. The portable electronic device according to claim 6, wherein the connector is a universal serial bus connector.

8. The portable electronic device according to claim 6, wherein the control unit is an embedded controller.

9. An electronic apparatus, comprising:
   a heat dissipation back clip, comprising:
     a thermoelectric cooling chip, having a cooling power consumption;
     a heat dissipation fan, having a heat removal wattage; and
     a controller, electrically coupled to the thermoelectric cooling chip and the heat dissipation fan, and configured to adjust the cooling power consumption and control operation of the heat dissipation fan; and
   a portable electronic device, wherein the heat dissipation back clip is adapted to be mounted on the portable electronic device, and the portable electronic device comprises:
     a connector, configured to be electrically connected to the heat dissipation back clip; and
     a control unit, electrically coupled to the connector, and configured to:
       detect a real-time system power consumption of the portable electronic device;

obtain the cooling power consumption and the heat removal wattage through the connector;

determine whether a sum of the real-time system power consumption and the cooling power consumption is greater than the heat removal wattage; and output an instruction to the controller through the connector to lower the cooling power consumption if the sum is greater than the heat removal wattage.

10. The electronic apparatus according to claim 9, wherein the heat dissipation back clip is clamped to a back cover of the portable electronic device.

* * * * *